(12) United States Patent
Brekelmans et al.

(10) Patent No.: US 8,491,365 B2
(45) Date of Patent: Jul. 23, 2013

(54) SPORTS VIDEO GAME WITH ENHANCED CONTROL FEATURES

(75) Inventors: Steven Brekelmans, Vancouver (CA);
Travis Brown-John, Vancouver (CA);
Carey Du Gray, Vancouver (CA);
Dwight Tomalty, Vancouver (CA)

(73) Assignee: Nintendo Co., Ltd., Kyoto (JP)

( * ) Notice: Subject to any disclaimer, the term of this patent is extended or adjusted under 35 U.S.C. 154(b) by 1376 days.

(21) Appl. No.: 11/866,433

(22) Filed: Oct. 3, 2007
(Under 37 CFR 1.47)

(65) Prior Publication Data

US 2009/0048009 A1    Feb. 19, 2009

Related U.S. Application Data

(60) Provisional application No. 60/956,607, filed on Aug. 17, 2007.

(51) Int. Cl.
*G06F 17/00* (2006.01)

(52) U.S. Cl.
USPC .................................. 463/4; 463/2

(58) Field of Classification Search
USPC ........................................................ 463/2–4
See application file for complete search history.

(56) References Cited

U.S. PATENT DOCUMENTS

| | | | |
|---|---|---|---|
| 6,066,046 A | 5/2000 | Yamamoto | |
| 6,273,814 B1 | 8/2001 | Komoto | |
| 6,428,411 B1 | 8/2002 | Togami | |
| 6,482,090 B1 * | 11/2002 | Rimoto et al. | 463/31 |
| 6,626,756 B2 | 9/2003 | Sugimoto | |
| 7,137,891 B2 | 11/2006 | Neveu et al. | |
| 2004/0176165 A1 | 9/2004 | Takahashi et al. | |
| 2006/0178179 A1 | 8/2006 | Neveu et al. | |

* cited by examiner

*Primary Examiner* — Michael Cuff
(74) *Attorney, Agent, or Firm* — Nixon & Vanderhye P.C.

(57) ABSTRACT

A battle volleyball or other sports game having both sports and battle game aspects is played between opposing teams. A game object, having at least one associated characteristic, is used in the game. An associated characteristic of the game object is altered based on properly timed player input, the input being timed to coincide with one or more action indicators displayed along a game object movement path. The game object may also negatively affect a health or other game character related parameter of a game character towards which the game object is directed.

19 Claims, 14 Drawing Sheets

NON-LIMITING
EXAMPLE GAME SYSTEM

NON-LIMITING EXAMPLE CONTROLLER

NON-LIMITING EXAMPLE CONTROLLER (Render Meter)

(Update Meter)

SPORTS VIDEO GAME WITH ENHANCED CONTROL FEATURES

CROSS-REFERENCES TO RELATED APPLICATIONS

This application claims the benefit of priority from provisional application No. 60/956,607 filed Aug. 17, 2007, incorporated herein by reference.

TECHNOLOGICAL FIELD

The technology herein relates to competitive video game play, and, more particularly, to a competitive multi-player video game played between opponents using a projectile such as a ball. Still more particularly, the technology herein relates to systems, methods, techniques and stored programs that provide a competitive video game having, in an illustrative implementation, both battle and sports game aspects, wherein a projectile is moved between competing player sides. Even more particularly, the technology herein relates to a competitive battle game including but not limited to a battle volleyball game.

BACKGROUND AND SUMMARY

Many of us are passionate or even fanatic about the sports we love. College stadiums and field houses literally rumble with the combined enthusiasm of thousands of spectators cheering on their teams. Professional team sports capture the hearts and imaginations of entire cities and regions. Wearing a certain hat or logo not only marks you as being from a great city such as Seattle, New York, Washington D.C., Boston or Osaka—it also marks you as having allegiance to the team you root for. Sports bars invest lots of money annually to provide the best possible equipment and environment for watching sports. Satellite, cable and broadcast networks devote vast resources to sports coverage. Sports scores and standings occupy significant portions of daily and weekly newspapers throughout the world.

Because of our love of sports, sports based video games have also been very successful. Some of the very first video games were sports based (e.g., tennis or hockey). Sports based video games allow game players to competitively play a wide variety of sports from the comfort of their living rooms, dens and college dorms. Many sports video games are released every year, each with unique features and aspects designed to draw game players' attention and provide new and interesting game play. Players can play as their favorite Pro-Bowl quarterback or All-Star basketball player, even if they have never competitively played football or basketball.

Sports video game developers face the challenge of how to introduce new and exciting features in new sports games that may otherwise be similar to predecessor games in fundamental game play aspects. After all, the game playing public generally expects a baseball video game to provide a reasonably accurate model of at least some aspects of the actual game of baseball. For example, most game players will expect a baseball video game to be played on a field with four bases, with two opposing teams each having nine players including a pitcher, first, second and third basemen, outfielders, shortstop and a catcher. Similarly, most game players will expect such a baseball video game to follow baseball scoring conventions, strikes and balls, number of outs per inning and the like. The same expectations would generally hold for video games modeled after volleyball, football, soccer, tennis, golf and any other popular sport.

Given the significant constraints imposed by such conventions, game developers generally have limited freedom to change fundamental aspects of game play that game players consider to be important. Even despite such constraints, however, there is room for substantial creativity in developing new sports games. In the past, sports video game developers often concentrated on making their game play as realistic as possible. Realistically modeling athletes in 3D animation enhances the game play experience. Another fertile area for innovation relates to special features that enhance the user's game play experience. For example, much work has been done in the past regarding scoring and statistics. User control features such as camera angle, instant replay and the like permit some sports video games to mimic televised sports. Other sports video games supply creative enhancements such as different kinds of virtual player vision, detailed control over player actions and reflexes, and the like. Such features allow the video game player sitting in his or her living room, den or college dorm to become a star pitcher or quarterback and win the game for his or her team. Competitive game play through direct or networked interaction allows video game players to test their skills and strategy against opponents.

Despite the vast amount of prior work and effort that has gone into developing ever more interesting and exciting sports video game play experiences, further improvements are desirable. Just as we never tire of the next baseball, football or soccer season, the video game playing community looks forward to release of yet another generation of sports video games. There is therefore a high premium on satisfying the demand for new, ever more exciting and interesting sports video game play.

Exemplary non-limiting illustrative implementations of the technology herein provide a competitive video game with both sports and battle game aspects presenting a novel and exciting game play experience. In one exemplary illustrative non-limiting implementation, a familiar game, such as volleyball, has been enhanced by adding a battle aspect. For example, in a traditional volleyball game, a player may move the ball around on one side of the court, eventually hitting or "spiking" the ball over the net to an opponent's side in a way that is difficult to return. The opponent responds to the ball movement by returning the ball to keep the ball in play. If the opponent attempting to dig the ball is out of position or fails to execute properly, the ball may fall to the ground or go sailing wildly off course, resulting in a point for the spiking player's team.

According to one exemplary illustrative non-limiting volleyball video game implementation, instead of punishing a player for a bad response by ending the point, the game may instead cause damage to a corresponding game character or avatar, but keep the ball in play. For example, in one exemplary illustrative non-limiting implementation, each game character may have an associated "health" parameter. When a game character's "health" is depleted, the character is disabled or may even die a virtual death. Even at this point the game play may continue. The ball can be kept in play and "volleyed" until some or all of the players on a team have become incapacitated. A volley for a point can also end on a variety of different other factors, including for example any character suffering damage, a time limit, a number of passes over the net, or the like. Many familiar volleyball aspects thus remain, but battle game aspects have also been added.

In one exemplary illustrative non-limiting implementations a projectile, in this example a virtual volleyball or other ball, moved between opponents, is used as a weapon against an opponent's game characters. For example, the harder a spiking game character strikes the ball, the more damage the ball may do to a game character that does not properly protect himself or herself by digging the spike.

In one exemplary illustrative non-limiting implementation, not only can the player affect the power used to spike the ball, but, according to a further exemplary implementation, the player may be able to "power up" or weaponize the projectile before the projectile reaches a game character who will use the projectile as a weapon. In the volleyball example implementation, this could be a volleyball power-up before the ball reaches the game character performing the spike. When another game character on the spiking game character's team tosses or "sets" the ball to the spiking character, the flight path of the ball may be shown. Along the spike path, one or more visual indicia prompting input may be displayed. As the ball travels along the displayed path, the player whose side controls the ball can attempt to power-up the ball by pressing a controller button as the ball passes over each prompt. If the press is timed correctly, the ball gains attack power. When the spike is completed, the attack might resultantly have much more power than it would have if the player had simply spiked an unaltered ball.

In another exemplary illustrative non-limiting implementation, the virtual projectile may change composition based on a specific input pattern. In the volleyball example, a series of prompts may appear on a spike meter displayed when volleyball is "set" from one game character to a teammate. Initially, the volleyball may appear to be composed of a traditional volleyball material, such as leather or plastic. By successfully timing a series of controller inputs to correspond with the ball passing over the prompts, the player may be able to change the virtual ball's virtual composition. For example, the player may change the ball into an ice-ball-thereby weaponizing the volleyball. The ice-ball may freeze an opponent on contact, or slow the opponent's responses, or do more damage because it is solid ice, etc.

In a still further exemplary illustrative non-limiting implementation, a projectile launched towards an opponent may be given a certain degree of power based on the timing of a controller button input. There may be one or more zones displayed at a spike's meter's end, and each zone may correspond to a particular power-up amount. For example, there may be plural zones displayed: for example, a large zone, a medium zone, and a small zone. In the volleyball example, these zones combine to form an area called the "spike touch." If the player presses a controller button to spike the ball while the ball passes through the large zone, the spike is successful, but with the least amount of power. If a button is pressed while the ball passes through the medium zone, the ball has a greater force behind it. If a button is pressed while the ball is in the smallest zone, the most powerful spike is performed. The buttons pressed may all be the same button, or they may be different buttons. Each zone can be sized with the degree of benefit being related to the degree of difficulty in timing the controller button press to coincide with the ball passing through the appropriate zone.

In yet another exemplary illustrative non-limiting implementation, a player may use one controller button to "attempt a strong attack" and another controller button to attempt a "weak attack." In this implementation, the "weak attack" button input does not have to be as precisely timed as the "strong attack" button input. If the "weak attack" button is pressed as the ball passes over prompt indicators, the ball gains some power, and the button can be successfully pressed while the ball is further from the center of the indicator. If the "strong attack" button is pressed, the ball may have to be closer to the center of the virtual indicator, and the player receives a stronger ball power-up. The software may treat the spike touch area similarly. If the "weak attack" button is pressed while the ball is in any of the three exemplary zones, the game character performs a successful, but weak, spike. If the "strong attack" button is pressed while the ball is in the medium or smallest zone, the game character performs a stronger or strongest spike respectively. If the strong attack button is pressed while the ball is in the largest zone, but not in another zone, the spike may fail.

In yet another exemplary illustrative non-limiting implementation, the game object path may be directed by a player input. For example, if the player is provided with a cross-button directional switch, different direction presses on the switch could cause the game object to behave differently after it is launched at an opposing player. An upward press on the switch could cause the game object to move in one pattern, while a downward press could cause the game object to move in another. Pressing forward may cause a third change, while pressing back may cause a fourth change. Leaving the switch untouched could simply cause the game object to take an ordinary path.

In still a further exemplary illustrative non-limiting implementation, the game can be played with a very limited number of switches and/or buttons. The game could be provided, for example, with an interface based entirely on single button press timing, allowing for a controller provided with nothing more than a single button to be used. All responsive game character movement could be based on whether or not the button was pressed at the appropriate times, each timing prompt indicated in some fashion, visually, audibly or tactilely.

According to another exemplary illustrative non-limiting implementation, the points for succeeding in a game action can vary from those that would be awarded in the actual sporting event depicted by the game. In this implementation, a randomization effect is provided. For example, a virtual spinning wheel is divided into sections, each section having a different point value. Before an action is taken that might result in a point under the particular game's traditional rules, the wheel is spun, producing a random value for the next point. To use the volleyball example, one traditional volleyball version is played in one-point increments up to fifteen. In the exemplary implementation, before each serve, the wheel is spun. Whatever value comes up is then the value of the point, if any, scored during that volley. After a point is scored the process is repeated, so the value of points can vary constantly throughout the game. The wheel may also be provided with a random-space, where a random affect takes place if the space is selected. For example, the players of the game could suddenly be launched into a mini-game, the result of which determines the value of the point for the next round.

Additional non-limiting exemplary advantageous features include:
- When the ball flies from opponent court, trying to receive it as good as possible (button operation)
- After the toss, before attacking, a ball path is displayed toward the attacker, and the ball reaches to the attacker along with the path
- There are some markers on the ball path and timing of pushing buttons along with the markers affects strength of the attack.
- Timing of pushing button along with the marker of attack causes the special effect and power of the attack to opponents court.
- The attacks with special effect and power are selected by cross key operations after the toss.
- Before the game start, a roulette game is done for setting score, and then start the ball game.

When the roulette stops at "?" frame, the game changes to other sorts of games such as pro-wrestling, and the result of such games becomes ball game score.

BRIEF DESCRIPTION OF THE DRAWINGS

These and other features and advantages will be better and more completely understood by referring to the following detailed description of exemplary illustrative non-limiting implementations in conjunction with the drawings of which.

DETAILED DESCRIPTION

Techniques described herein can be performed on any computer graphics system including a personal computer, a home video game machine, a portable video game machine, a networked server and display, a cellular telephone, a personal digital assistant, or any other type of device or arrangement having computation and graphical display capabilities. One exemplary illustrative non-limiting implementation includes a home video game system such as the Nintendo Wii 3D video game system, a Nintendo DS or any other 2D or 3D capable interactive computer graphics display system. One exemplary illustrative non-limiting implementation is described below, but other implementations are possible.

Exemplary Video Game Platform

Figure 1:
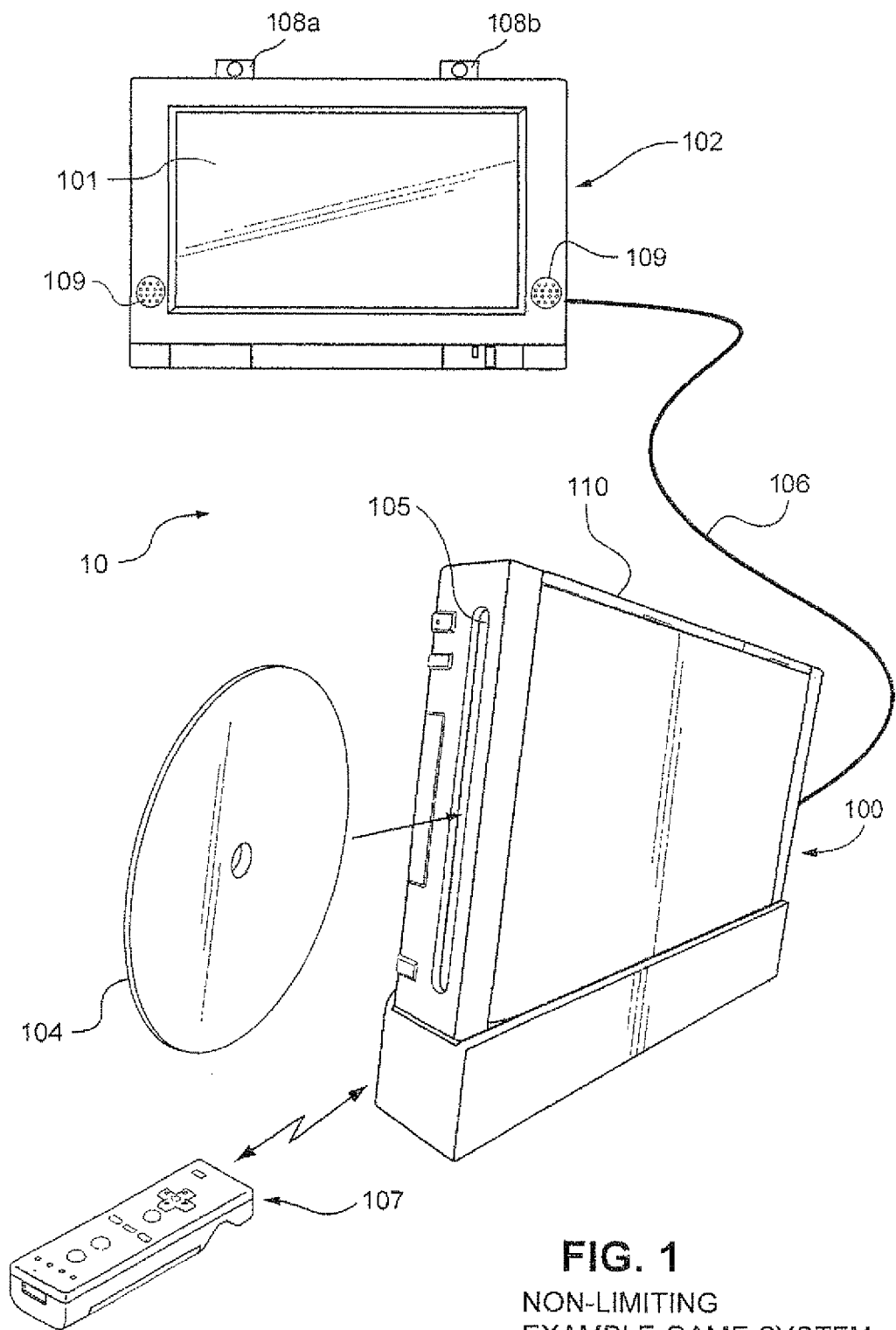
FIG. 1 shows an external view of an exemplary non-limiting interactive computer graphics system in the form of a home video game apparatus for executing a game program.

FIG. 1 shows a non-limiting example game system 10 including a game console 100, a television or other display 102 and a handheld controller 107. Game console 100 executes a game program or other application stored on optical disc 104 or other memory media inserted into slot 105 formed in housing 110. The game program (or other application) execution result is displayed on display 102 to which game console 100 is connected by a cable 106 or otherwise. Audio associated with the game program or other application is output via speakers 109. While an optical disk is shown in FIG. 1 for use in storing video game software, the game program or other application may alternatively or additionally be stored on other storage media such as semiconductor memories, magneto-optical memories, magnetic memories and the like and/or downloaded over a network or by other means.

An exemplary illustrative non-limiting handheld controller implementation 107 wirelessly transmits game control (and other) data to the game console 100. Controller 107 may also wirelessly receive data transmitted from game console 100. Any of various wireless protocols such as Bluetooth®, RF, IR or other protocols may be used for the wireless transmissions between controller 107 and game console 100.

Exemplary controller 107 includes an imaging information calculation section (FIG. 5) for capturing and processing images from light-emitting devices 108a and 108b associated with television 102. A center point between light-emitting devices 108a and 108b may be aligned with a vertical center line of display 102. The images from light-emitting devices 108a and 108b can be used to determine a direction in which controller 107 is pointing as well as a distance of controller 107 from display 102. By way of example without limitation, light-emitting devices 108a and 108b may be implemented as two LED modules (hereinafter, referred to as "markers") provided in the vicinity of a display screen of television 102. The markers each output infrared light. The imaging information calculation section of controller 107 detects the light output from the LED modules to determine a direction in which controller 107 is pointing and a distance of controller 107 from display 102. Although markers 108a and 108b are shown in FIG. 1 as being above television 100, they may also be positioned below television 100 or in other configurations. Other implementations of the systems and methods described herein do not require use of such markers.

Figure 2:
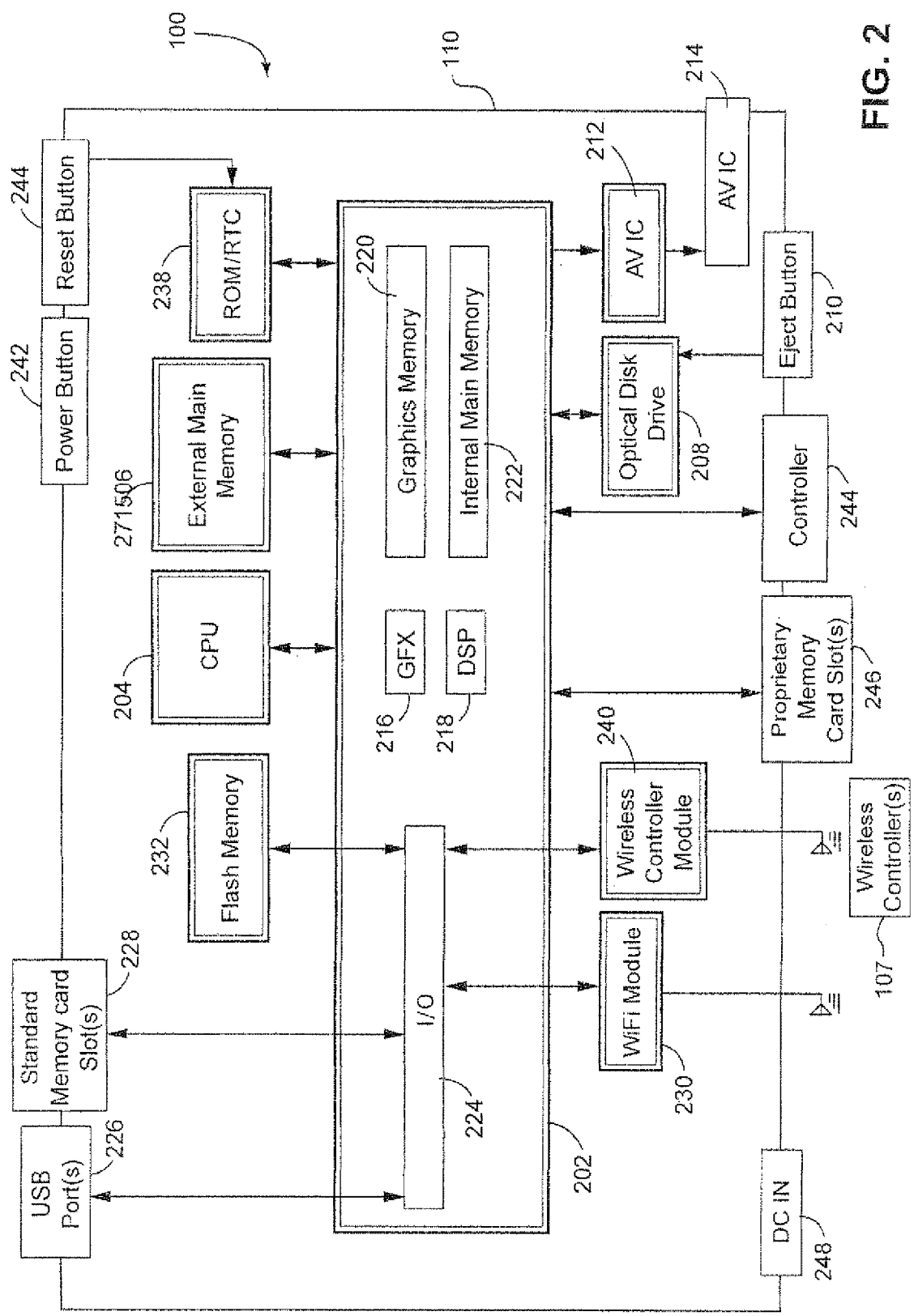
FIG. 2 is a block diagram showing an illustrative internal structure of the exemplary non-limiting game apparatus.

With reference to the block diagram of FIG. 2, an exemplary illustrative non-limiting game console 100 includes a RISC or other central processing unit (CPU) 204 for executing various types of applications including (but not limited to) video game programs. CPU 204 executes a boot program stored in a boot ROM (not shown) to initialize game console 100, and then executes an application (or applications) stored on optical disc 104 which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216; and optical disks of a second type (e.g., of a second size and/or a second data structure) containing applications originally developed for execution by a different CPU and/or graphics processor. For example, the optical disks of the second type may be applications originally developed for the Nintendo GameCube or other platform.

CPU 204 is connected to system LSI 202 that includes graphics processing unit (GPU) 216 with an associated graphics memory 220, audio digital signal processor (DSP) 218, internal main memory 222 and input/output (10) processor 224. IO processor 224 of system LSI 202 is connected to one or more USB ports 226, one or more standard memory card slots (connectors) 228, WiFi or other wireless or other LAN module 230, flash memory 232 and wireless controller module 240.

USB ports 226 are used to connect a wide variety of external devices to game console 100 These devices include, by way of example without limitation, game controllers, keyboards, storage devices such as external hard-disk drives, printers, digital cameras, and the like. USB ports 226 may also be used for wired network (e.g., LAN) connections. In one example implementation, two USB ports 226 are provided but other configurations are possible.

Standard memory card slots (connectors) 228 are adapted to receive industry-standard-type memory cards (e.g., SD memory cards) in one exemplary illustrative non-limiting example. In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like. Flash memory 232 stores, by way of example without limitation, game save data, system files, internal applications for the console and downloaded data (such as games).

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communicating with other game devices such as suitably-equipped hand-held game devices. Module 230 is referred to herein as "WiFi", which is generally used in connection with the family of IEEE 802.11 specifications. However, game console 100 may of course alternatively or additionally use wireless modules that conform with other wireless or wired standards.

Wireless controller module 240 receives signals wirelessly transmitted from one or more controllers 107 and provides these received signals to 10 processor 224. Any number of separate controllers may be used to provide multi-player inputs. The signals transmitted by controller 107 to wireless controller module 240 may include signals generated by controller 107 itself as well as by other devices that may be connected to controller 107. By way of example, some games may use separate right- and left-hand inputs. For such games, another controller (not shown) may be connected to controller 107. Controller 107 could transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240 or otherwise.

Proprietary memory card slots 246 may be adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube or other platform. In this case, memory cards inserted in such slots can transfer data from games developed for the GameCube or other platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 may be adapted for wired connection to respective game controllers. In one example implementation, four such connectors are provided for wired connection to game controllers for the Nintendo GameCube or other platform. Alternatively, connectors 244 may be connected to respective wireless receivers that receive signals from wireless game controllers. These connectors enable players, among other things, to use controllers for the Nintendo GameCube or other platform when an optical disk for a game developed for this platform is inserted into optical disk drive 208.

A connector 248 is provided for connecting game console 100 to DC power derived, for example, from an ordinary wall outlet. Of course, the power may be derived from one or more batteries or by any other desired means.

GPU 216 performs image processing based on instructions from CPU 204. GPU 216 includes, for example, circuitry for performing calculations and operations for displaying textured and/or shaded three-dimensional (3D) graphics. GPU 216 performs image processing using graphics memory 220 (which may be dedicated for image processing) and internal main memory 222. GPU 216 generates image data for output to display 102 by audio/video connector 214 via audio/video IC (interface) 212. External main memory 206 and internal main memory 222 are storage areas directly accessible by CPU 204. For example, these memories can store an application program such as a game program read from optical disc 104 by the CPU 204, various types of data or the like.

Audio DSP 218 performs audio processing based on instructions from CPU 204. The audio generated by audio DSP 218 is output to speakers 109 by audio/video connector 214 via audio/video IC 212.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 is depressed for a specified time (e.g., one or two seconds) to turn the console off so as to reduce the possibility of inadvertent turn-off. Reset button 244 is used to reset (re-boot) game console 100.

Figure 3A:
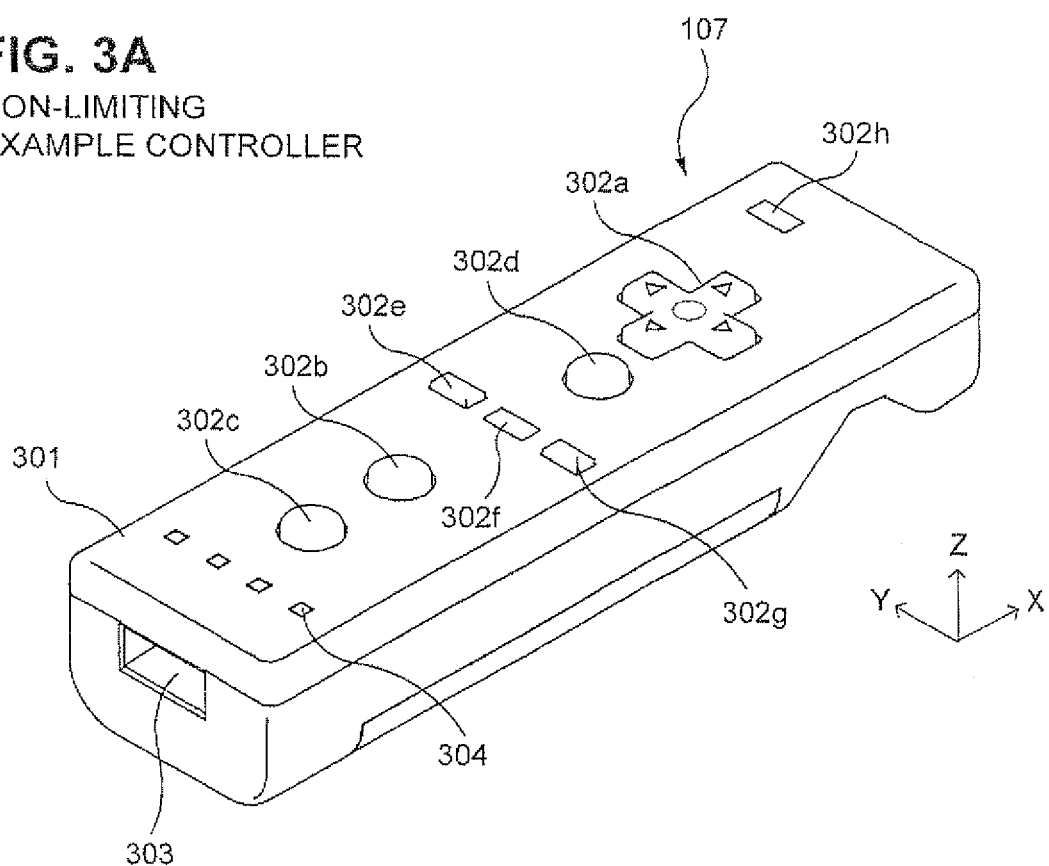
FIGS. 3A, 3B and 4 show different views of an exemplary illustrative non-limiting handheld controller for the video game system of FIG. 1.
Figure 3B:
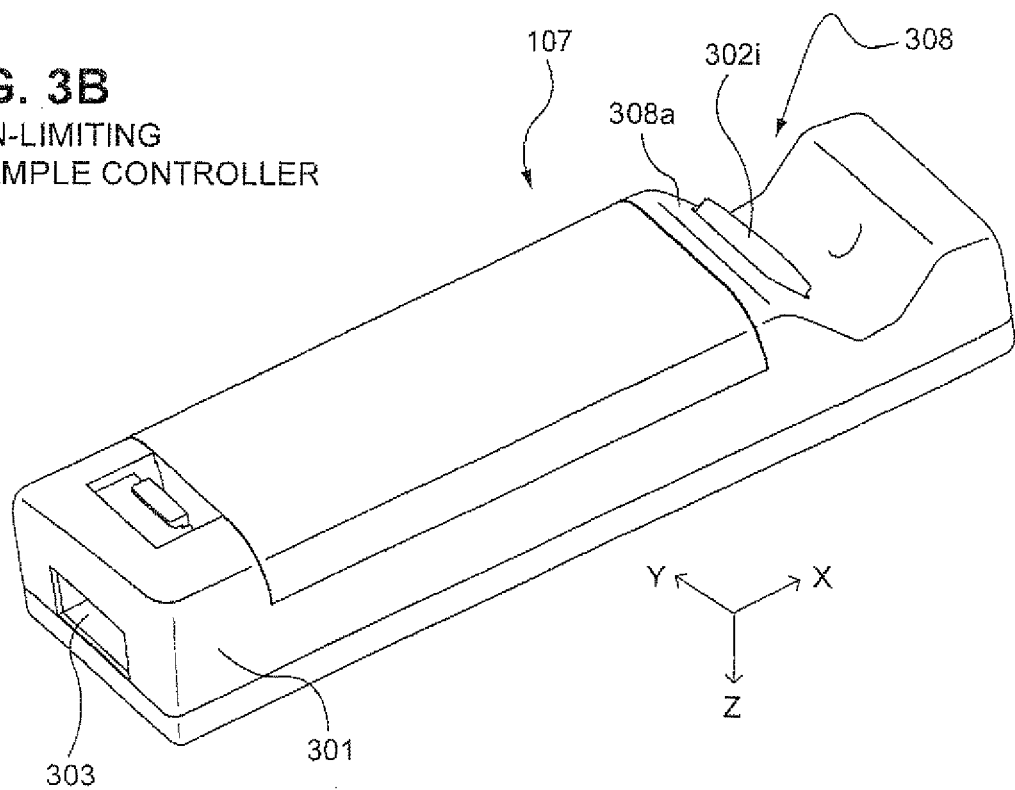
Figure 4:
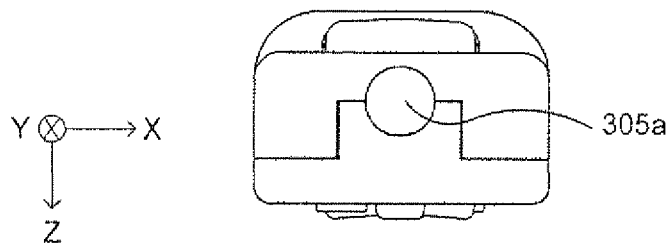

With reference to FIGS. 3A, 3B and 4, example controller 107 includes a housing 301 on which operating controls 302a-302h are provided. Housing 301 has a generally elongated rectangular shape and is sized to be conveniently holdable in a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world, control a ball or other projectile, etc.

Cross-switch 302a is described by way of example. Other types of operation sections may be used. By way of example without limitation, a composite switch including a push switch with a ring-shaped four-direction operation section and a center switch may be used. By way of further example without limitation, any or all of the following may be used:

an inclinable stick such as a joystick projecting from the top surface of housing 301 that outputs signals in accordance with the inclining direction of the stick;

a horizontally slidable disc-shaped member that outputs signals in accordance with the sliding direction of the disc-shaped member;

a touch pad;

separate switches corresponding to at least four directions (e.g., front, rear, right and left) that output respective signals when pressed by a player;

other.

In one exemplary illustrative non-limiting implementation, buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button. Buttons 302e through 302g are respectively a select switch, a menu switch and a start switch, for example. Generally, buttons 302b through 302g are assigned various (variable) functions in accordance with the application being executed by game console 100. In an exemplary arrangement shown in FIGS. 3A, 3B, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent depression by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent depression.

In one exemplary illustrative non-limiting implementation, a plurality (e.g., four) of LEDs 304 is provided rearward of button 302c on the top surface of housing 301. Controller 107 is assigned a controller type (number) so as to be distinguishable from the other controllers used with game console 100 in a multiplayer context. LEDs 304 may be used to provide a player a visual indication of his or her assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting or other game.

As shown in FIG. 4, an imaging element 305a is provided on a front surface of controller housing 301 in one exemplary illustrative non-limiting implementation. Imaging element 305a is part of an imaging information calculation section of controller 107 that analyzes image data received from markers 108a and 108b. Imaging information calculation section 305 has a maximum sampling period oft for example, about 200 frames/sec., and therefore can trace and analyze even relatively fast motion of controller 107. Additional details may be found in Application Nos. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application number 60/732,649, entitled "INFORMATION PROCESSING SYSTEM AND PROGRAM THEREFOR," filed on Nov. 3, 2005. The entire contents of each of these applications are incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads, touchpads and output devices such as speakers and displays may be connected to controller 107 using connector 303 or by other means.

For ease of explanation in what follows, a coordinate system for controller 107 will be defined. As shown in FIGS. 3A, 3B and 4, a left-handed X, Y, Z coordinate system has been defined for controller 107. Of course, this coordinate system is described by way of example without limitation and the systems and methods described herein are equally applicable when other coordinate systems are used.

Figure 5:
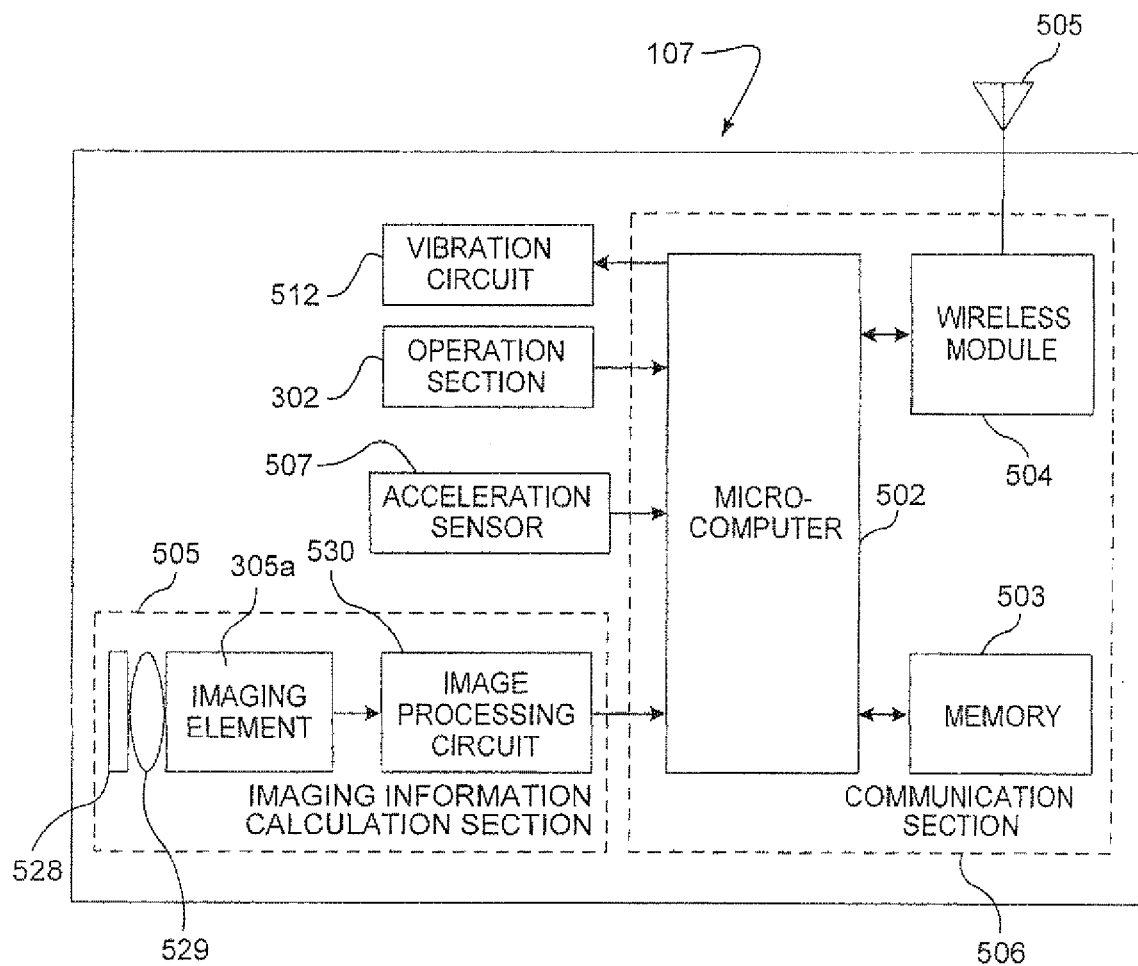
FIG. 5 is a block diagram of an exemplary illustrative non-limiting implementation of the handheld controller.

As shown in the block diagram of FIG. 5, controller 107 includes a three-axis, linear acceleration sensor 507 that detects linear acceleration in three directions, i.e., the up/down direction (Z-axis shown in FIGS. 3A, 3B and 4), the left/right direction (X-axis shown in FIGS. 3A, 3B and 4), and the forward/backward direction (Y-axis shown in FIGS. 3A, 3B and 4). Alternatively, a two-axis linear accelerometer that detects only linear acceleration along each of the Y-axis and Z-axis may be used or a one-axis linear accelerometer that detects only linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of a type available from Analog Devices, Inc. (ADXL303) or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers as used in acceleration sensor 507 are capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 in one exemplary illustrative non-limiting implementation cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of controller 107 relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user.

In other exemplary illustrative non-limiting implementations, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity). Controllers not equipped with motion sensing technology can also be used with the exemplary illustrative non-limiting implementations.

FIG. 5 shows image information calculation section 505 of controller 107 as including infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 309. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined. Controllers not equipped with light detecting technology can also be used with the exemplary illustrative non-limiting implementations.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player holding controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, motion of controller 107 can be determined.

In one exemplary illustrative non-limiting implementation, communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at a predetermined time interval. Because game processing is generally performed rapidly at for example a cycle of 1/60 sec. (16.7 ms), the wireless transmission is preferably performed at a cycle of a shorter time period. For example, a communication section structured using Bluetooth® technology can have a cycle of 5 ms. At transmission time, micro-computer 502 outputs the transmission data stored in memory 503 as a series of operation information to wireless module 504.

Wireless module 504 uses, for example, Bluetooth® technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth® technology, controller 107 can also receive data wirelessly transmitted thereto from devices including game console 100. Controllers 107 connected to a game console or other device by a wire or other means may also be used with the exemplary illustrative non-limiting implementations.

The exemplary illustrative non-limiting system described above can be used to execute software stored on optical disk 104 or in other memory that controls it to implement a sports game having enhanced control features as described below. Exemplary illustrative non-limiting software controlled techniques and methods for implementing such a game will now be described.

Exemplary Illustrative Non-Limiting Battle Volleyball Game Play

Figure 6:
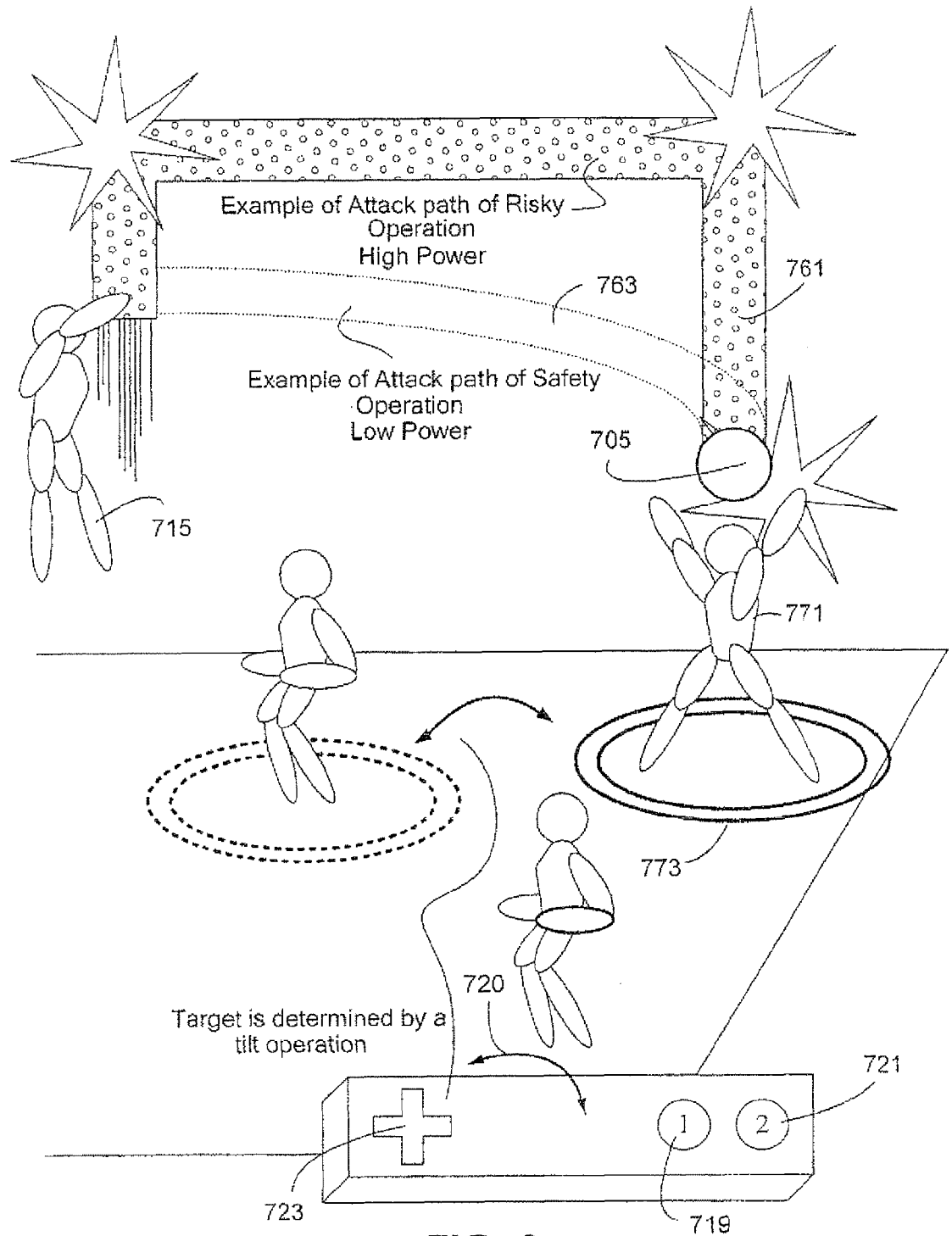
FIG. 6 shows an exemplary view of a game character spiking a ball to an opponent's game character in an exemplary battle volleyball video game.

FIG. 6 shows an exemplary volleyball game according to one exemplary illustrative non-limiting implementation. In this example, a spiking character 715 is shown having just spiked the ball 705 towards an opposing team of game characters 771.

If the spiking character has successfully implemented a high-power spike, one high-power ball flight path example 761 is shown. The ball 705 need not travel according to conventional physics, making it more difficult to judge when the ball 705 will land and making the ball more difficult to receive.

If the spiking character has successfully implemented a low-power spike, the ball may take a more direct, conventional path 763, and it may be easier for the receiving player to time a receive action operation.

Also, in this exemplary implementation, the spiking player is attempting to damage the opposing game characters 771, so the player may be given an option to target 773 a particular game character 771. One exemplary way to perform target switching is, if the controller is outfitted with a motion detector, to move 720 the controller to select different targets 773. In this exemplary implementation, the controller can be moved 720 at any time before the ball leaves the spiking character 715, so the player can target one game character and then, at the last second, switch the target 773 to a different game character. Target selection may also be performed using buttons, joysticks, or any other suitable means.

Although the ball paths 761, 763 were determined based on the degree of power in this exemplary implementation, the player might also affect a ball path by pressing the directional controller 723. For example, pressing up on the controller 723 could cause the ball 705 to perform a loop in the air. Pressing down on the controller 723 could alternatively cause the ball 705 to zig-zag. Pressing back on the controller could cause the ball to suddenly slow-up in its travel from the spiking character 715 to the receiving character 771, and pressing forward on the controller could cause the ball to suddenly accelerate along the path from the spiking character 715 to the receiving character 771.

Figure 7:
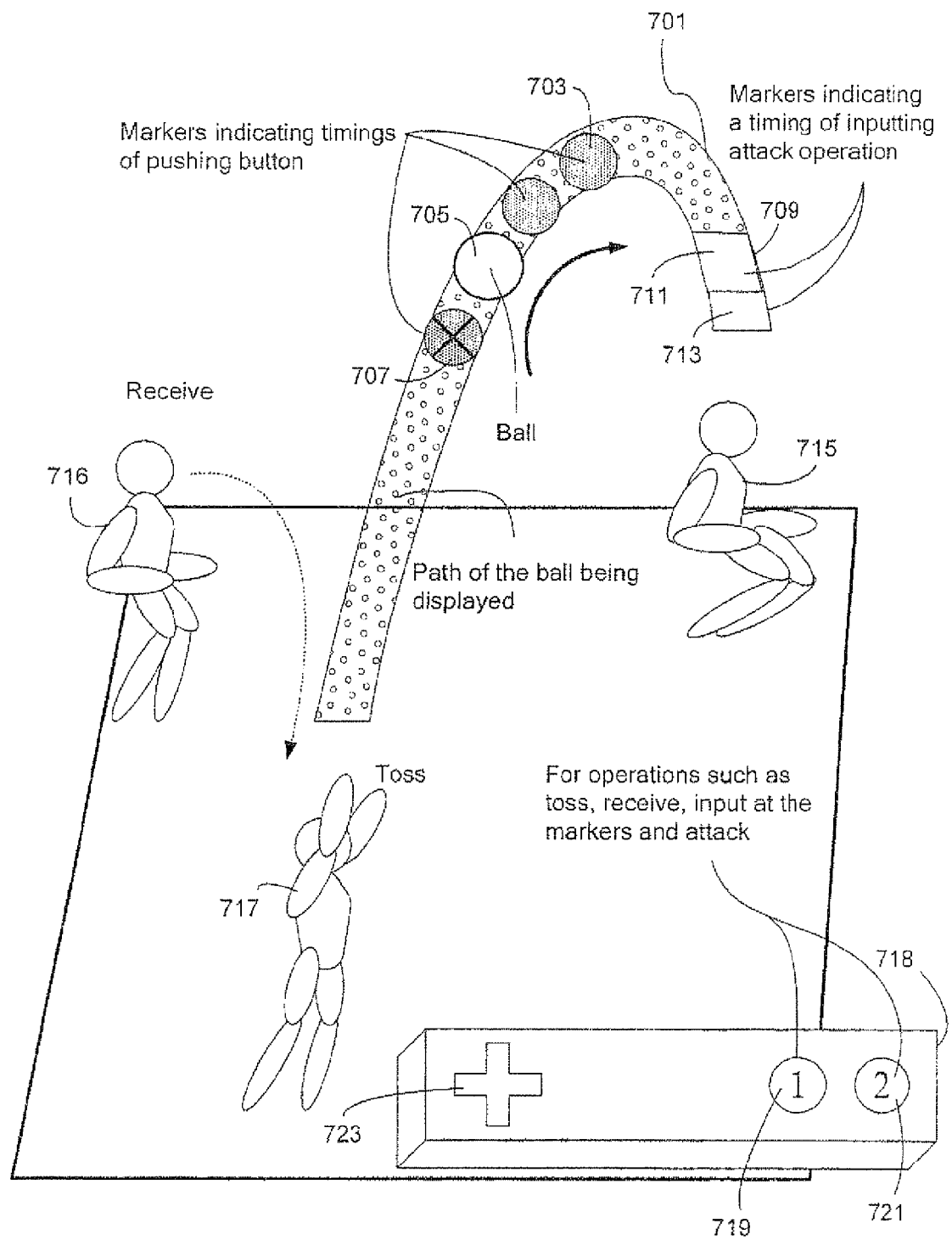
FIG. 7 shows an exemplary view of one exemplary implementation of a volleyball game with a ball in transit.

In the FIG. 7 exemplary illustrative non-limiting volleyball game implementation, the game has three game characters or avatars 715, 716, 717 on a side. Once the ball 705 has passed over to the game characters' (block 715, 716, 717) side of the court, one of the characters 716 may receive or "dig" the ball 705 The character 716 who digs the ball 705 then may pass the ball 705 to a second character 717. This character 717 then may perform a toss or "set" of the ball 705 to a character 715 in position to spike the ball 705. As in a real world volleyball game, the character digging the ball may also elect to set the ball directly to a spiking character.

According to this exemplary implementation, when the set is performed, a spike meter 701 is shown, detailing the ball path from the setting character 717 to the spiking character 715. A series of power-up timing markers or "pips" 703 may also be displayed along the spike meter 701. As the ball 705 travels from the setting character 717 along the spike meter 701, it passes over the pips 703. Some indication that the ball 705 is over a pip 703 may be provided, such as changing the color of the ball 705, a marker showing the ball's (block 705) center, etc. Additionally, the pips 703 may be displayed as bulls-eyes to allow a player to better determine when the ball 705 is centered over a pip 703. When the player thinks the ball 705 is approximately centered over a pip 703, the player may then press an input button 719, 721 provided on a controller 718. Other input indication may also be used, such as a controller motion, if the game is provided with a motion detecting controller.

In this exemplary implementation, the buttons 719, 721 correspond to a strong or "risky" button 719 and a weak or "safe" button 721. If the player elects to press the risky button 719, the player should be more accurate with the button press timing in order to have the desired effect occur. That is, the player may be expected to wait until the ball 705 is approximately centered over the pip 703 before the player presses the risky button 719. Alternatively, if the player elects to press the safe button 721, the player has a greater degree of latitude with the ball's 705 positioning in relation to the pip's 703 center. Consequently, it may be easier to succeed when implementing a safe button input. Although aligning the ball's 705 center with the pip's 703 center is the timing method according to this exemplary implementation, other suitable determination methods may also be used.

According to this exemplary illustrative non-limiting implementation, the pips 703 are shown as having a plurality of zones 704, 706. The larger zone 706, corresponds to a zone in which the safe button 721 may be successfully used. This zone also encompasses and includes the smaller zone 704. Essentially, in this exemplary implementation, any time a designated portion of the ball 705 (here the center) is within the larger zone 706, the safe button 721 can be pressed and the game will register a successful operation of the safe button 721.

In addition to the large zone 706, corresponding to the safe button 721, a smaller zone 704, corresponding to the risky button 719, has been provided in this exemplary implementation. When the designated portion of the ball 705 (here the center) passes through the smaller zone 704, the player can successfully use the risky button 719. Since the ball 705 is in the smaller zone 704 for a shorter period of time than it is in the larger zone 706, the player will likely find it more difficult to successfully time a press of the risky button 719 while the ball 705 is in the small zone 704. Additionally, if the player presses the risky button 719 while the designated portion of the ball 705 is in the larger zone 706, but not the smaller zone 704, the press will not register as successful. In this way, the player can elect to try and time the safe button 721 at any point while the designated ball portion is in either zone 706, and receive a safe result, or the player can try the more difficult timing of pressing the risky button 719 only while the ball portion is in the smaller zone 704 and receive a risky result.

Pressing the risky button 719 has a greater player reward in this exemplary implementation. If the player successfully times the risky button 719 press, the ball 705 is powered-up to a certain degree. If the player successfully times the press of the safe button 721, the ball 705 is also powered up, but to a lesser degree. If the player presses the risky 719 or safe 721 button while the ball 705 is not in an appropriate position, the opportunity to take advantage of that particular pip 703 is lost. This may result in the pip being crossed out 707 or some other visual, audible or tactile miss designation.

While two levels of difficulty have been presented with respect to the exemplary implementation, it will be appreciated that anywhere from one to any number of levels could be provided, corresponding to different buttons or designated for triggering by the same button.

Additionally, in this implementation, the spike meter 701 may also have a portion at one end called a spike touch 709. The spike touch may be divided into one or more zones 711, 713, and the zones are indicative of when the spike instruction should be given. As the ball 705 reaches the spike meter's (block 701) end, it will pass through the zones 711, 713. Just as with the pips 703, it is incumbent on the player to time the risky or safe button press as the ball passes through a particular zone. According to this implementation, if the ball is passing through either the larger zone 711 or the smaller zone 713, the safe button 721 can be pressed to effectuate a weaker spike. If, however, the player desires a more powerful spike, the player may wait until the ball is in the smaller zone 713 and press the risky button 719. Pressing either button too early or too late will result in a failed spike attempt, which, in this example, causes the game character to lob the ball over to the other side.

Figure 8A:
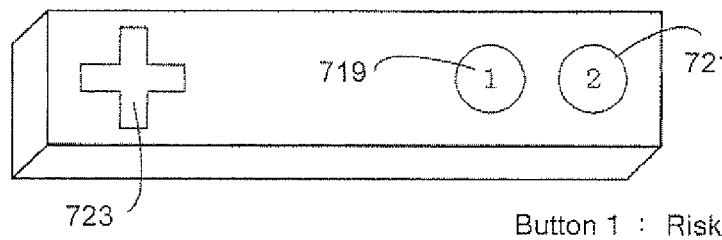
FIG. 8A shows different exemplary illustrative non-limiting spike meters.
Figure 8A:
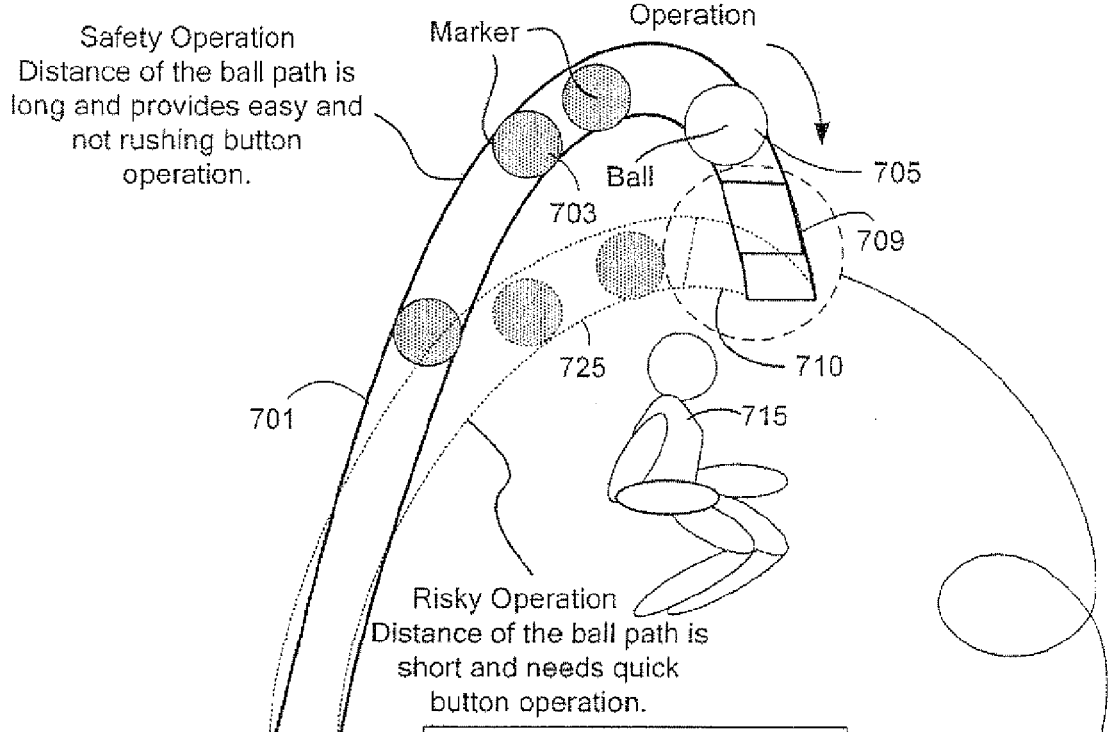

A further exemplary illustrative non-limiting implementation is shown in FIG. 8A, where an exemplary volleyball game's set operation is shown. Again, the player has the option to choose between a button corresponding to a risky operation 719 or a button corresponding to a safe operation 721. Before setting the ball 705 to the spiking character 715, the setting character 717 will have received the ball from elsewhere. In this implementation, to add an additional degree of skill to the game, and to allow for a plurality of possible spike meters, the player may choose to make a risky set or a safe set. The risky set, shown by the lower spike meter 725, might be used in an instance when the player wants to quickly return the ball to the other side, whereas the safe set, shown by the upper spike meter 705, might be used if the player is more concerned with a successful return than a swift one. Additionally, electing a risky set might add additional power to the ball 705.

In order to make the set, the player waits as the ball 705 approaches the setting character 717. When the ball has approximately reached the setting character 717, the player presses the risky button 719 or the safe button 721. If the player does not time the button press correctly, the set may default to a safe set or the setting character may just lob the ball 705 over to the other team. It may also be more difficult to make the risky set, so the player may have to be more accurate with the risky button 719 press timing to coincide with the ball's (block 705) arrival at the setting character 717.

Also, because the ball travels along a shorter spike meter from the setting character to the spiking character during this exemplary risky set, timing button presses to coincide with the ball 705 passing over pips 703 may be more difficult, as the ball may be moving faster. Due to this increased difficulty, the player electing to use the risky spike meter 725 may gain greater power-ups for successfully timing button presses. Also, the ball 705 may pass through the spike touch 710 more quickly than it would through the safe set's spike touch 709. As with the pips 703 along the risky set path, a player may get a more powerful spike from using a risky set's more difficult spike touch 710.

Figure 8B:
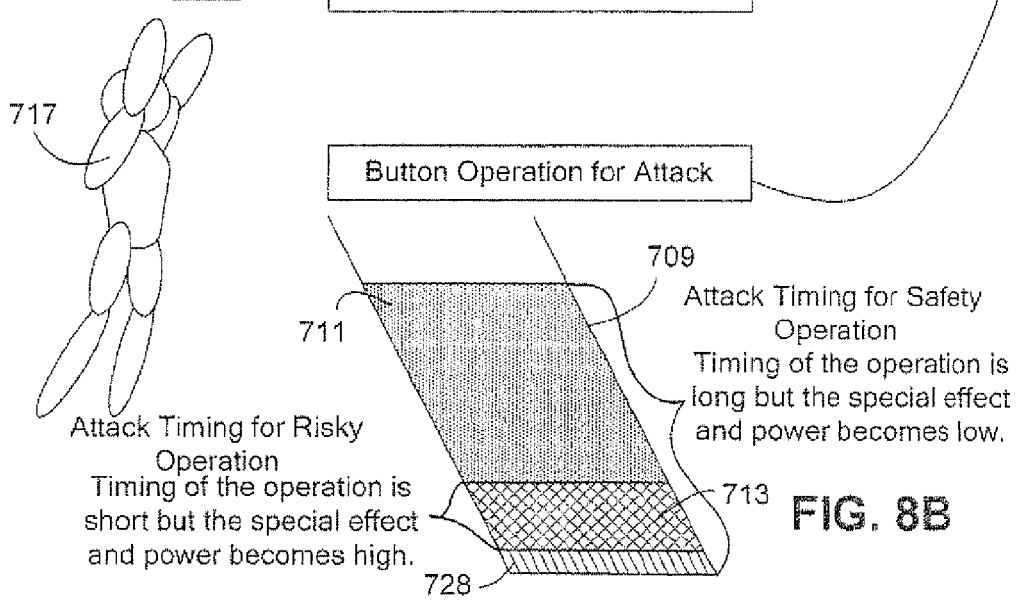
FIG. 8B shows exemplary spike touch provided with a plurality of exemplary zones.

FIG. 8B shows an exemplary illustrative non-limiting spike touch 709 implementation. In this example, the spike touch 709 is divided into three different zones: for example, a safe zone 711, a risky zone 713, and a perfect zone 727. Triggering different buttons in different zones will result in different spike power. Additionally, each zone also covers all smaller zones, so the safe zone 711 also encompasses the risky zone 713 and the perfect zone 727, and the risky zone 713 also encompasses the perfect zone 727.

According to this exemplary implementation, when the ball is passing through the safe zone 711, the player can choose to press the safe button at any point. This will result in a successful spike, but it will also result in the weakest successful spike.

If the player desires a more powerful spike, the player can wait until the ball passes into the risky zone 713, and then press the risky button. This will result in a more powerful spike, but also requires better timing, because the zone is significantly smaller than the safe zone 711.

If the player desires the most powerful spike, the player can press the risky button while the ball is in the perfect zone 727. This zone 727 may be so small that the ball is positioned correctly for only a brief moment, but the spike may be a devastating one that incurs a lot of damage.

As noted above, if the player presses the safe button while the ball is in the risky 713 or perfect 727 zones, the safe spike will result, since the safe zone 711 encompasses the risky 713 and the perfect 727 zones. Also, in this example, pressing the risky button while the ball is in the perfect zone 727 results in a perfect spike, rather than a risky one, since there are only two buttons. But, if a third button were used to attempt a perfect spike, then according to this implementation pressing the risky button while the ball was in the perfect zone 727 would result in a risky spike. Or, if single button game play is desired, all zones may be independent, and one button can be used to indicate a spike. In this case, the power may be solely determined by which zone the ball is in when the button is pressed.

Figure 9:
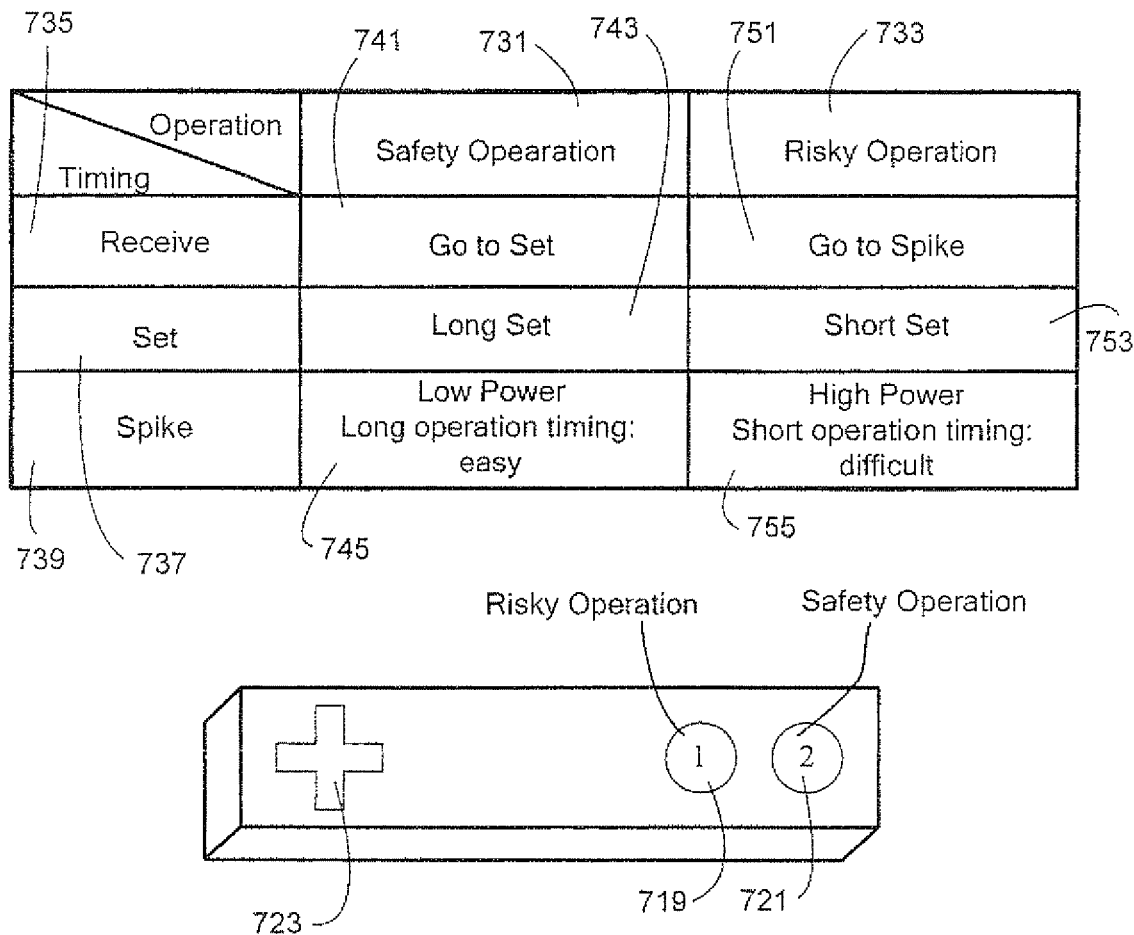
FIG. 9 shows exemplary responses to exemplary operations.

FIG. 9 shows an exemplary volleyball game's operation and timing according to one exemplary illustrative non-limiting implementation. The top row corresponds to a safe button 721 safe operation 731 and a risky button 719 risky operation 733. The first column corresponds to a state in which the ball arrives at a game character, making the character ready to receive 735, set 737, or spike 739.

Although in the previous examples the spike meter and spike touch were only provided for the ball transitioning from a setting character to a spiking character, similar meters and timers could also be implemented as the ball travels towards a player receiving the ball after any hit is made (e.g. after a spike, a pass, a block, etc.). Or, as described above, a receiving character and/or a setting character could simply time the ball's approach and press either the risky 719 button or the safe 721 button as the ball approaches. A single button may also be used in lieu of the risky and safe buttons, or more than two buttons with varying designations of skill/results may be provided.

The exemplary FIG. 9 chart shows exemplary software responses in each of six situations. For example, when the ball is traveling from a spiking character to a receiving character, and the player elects to press the safe button, the ball moves from the receiving character to a setting character as indicated by the "go to spike" 741. If, alternatively, the player presses the risky button 719, the ball goes straight to the spiking character, as indicated by the "go to spike" 751. In this exemplary implementation, the risky operation must be timed with a greater degree of accuracy, so if a player wishes to immediately set up a spike, the player does so at a greater risk that the timing will be off. Also, if the "go to spike" 751 is effective, then a spike meter will be displayed from the receiving character to the spiking character.

If the ball is traveling from a receiving character to a setting character, the player can also elect a risky operation 733 or a safe operation 731. Choosing the safe operation may result in a long set 743 from the setting character to the spiking character. Choosing the risky operation may result in a short set 753 from the setting character to the spiking character.

Since in this exemplary implementation the ball does not hit the ground upon failure to correctly time a move, numerous different effects can be applied if a move is ill-timed. For example, if the receiving character fails to receive the ball based on a correctly timed operation, the receiving game character may suffer damage or even be eliminated from the game. A setting character who fails to dig a spike may also suffer some damage, or may just lob the ball over the net instead of successfully setting the ball. Other effects may also be applied, depending on the particular game and the nature of the game play.

If the ball is traveling from a setting character to a spiking character and the player elects the risky operation 733, the game character performs a high-powered spike 755. As noted on the exemplary FIG. 9 chart, because of the timing necessary with the spike touch, there may only be a short window in which this choice can successfully be performed so it may be a more difficult option. Or, the player can elect the safe operation 731, which results in the game character performing a low-power spike 745. Since the timing zone of the spike touch may be larger for the safe operation, there may be more time in which to perform the operation, and the operation may therefore be easier to perform.

Exemplary Video Game Structure and Operation

Figure 10:
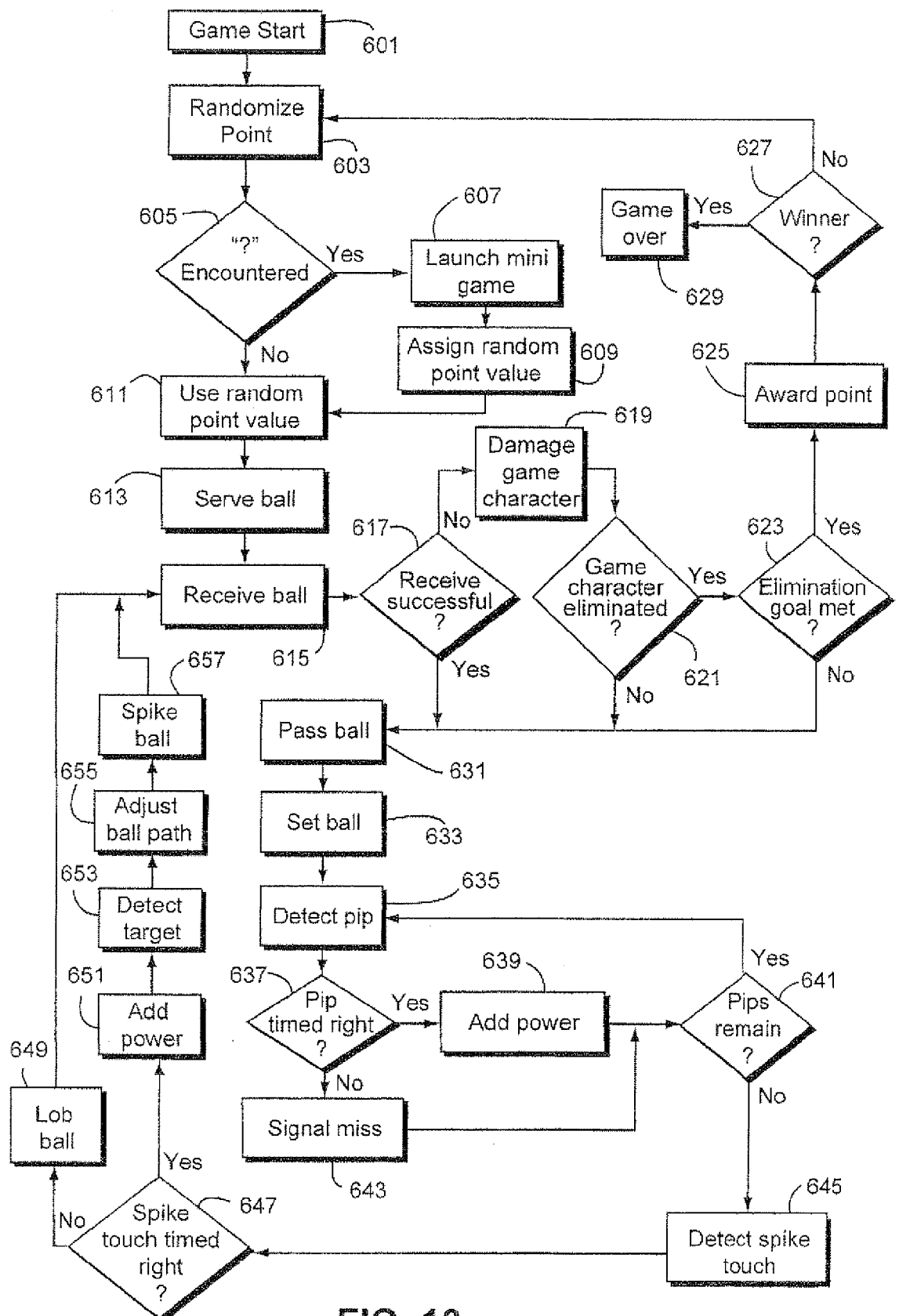
FIG. 10 shows an exemplary flow of a battle volleyball game according to one illustrative exemplary non-limiting implementation.

According to one exemplary illustrative non-limiting implementation, a battle style volleyball game proceeds as shown by the exemplary non-limiting FIG. 10 flow diagram. Although a volleyball example is used here, the exemplary illustrative non-limiting implementations can be applied to a variety of other games such as tennis, badminton, baseball, soccer or any other game. Also, although an exemplary software flow algorithm is shown, many different algorithms can be used to accomplish similar results.

In the non-limiting battle volleyball example, a game between opponents begins (block 601) by randomizing point values for each point (block 603). In this example, a random value is assigned to each point before the point is played. For example, a spinning wheel may be displayed, divided into a number of wedges. Each wedge may have a point value, or another designation, such as "?" may be assigned to it. Any sort of randomization algorithm and depiction may be used. Alternatively, any traditional or non-traditional scoring method may be used.

When the wheel stops spinning, the game software determines whether or not a "?" space was determined to be the point value (block 605). If not, the software uses the point value designated by the wheel result (block 611).

If a "?" space was encountered, the software may launch a mini-game between players (block 607), the result of which determines (609) the next point value used (block 611). A variety of options could be assigned to this mini-game point value determination For example, the point value could be based on the final mini-game score, or some other mini-game aspect.

Once the point value to be used is determined (block 611), the player whose service it is serves the ball (block 613). In response to a serve, an opposing player's game character receives the serve (block 615).

In this exemplary implementation, to successfully receive the ball (block 615), the player is expected to hit the "receive" button on controller 107 at approximately or nearly exactly the same time that the ball arrives at the player's game character or avatar. The timing mechanism for the receive input can be based on any suitable determination. If the receive is successful, that is, if the player has correctly timed the button press, then the game character passes the ball to another player (block 631). If, however, the player does not time the button press correctly, then the ball causes damage to the game character (block 619), but the ball is nevertheless still passed to another player (block 615). In addition to damaging the receiving game character (block 619) and passing the ball (block 615), the software also checks to see if the game character is eliminated (block 621). If the game character is not eliminated, then the pass is completed and the game play continues on.

If the game character is eliminated, however, the software must further check to see whether an elimination goal was met (block 623). For example, an elimination goal may be used to eliminate a single opposing player, or the goal could be to eliminate a specific player, several players, the entire opposing team, etc.

If the elimination goal is met, then the software awards the point value for winning that round to the player meeting the goal (block 625). The software may then check the scores and determine if there is a winner (block 627). If there is, the game ends (block 629). Otherwise, the game continues with a newly randomized point (block 603).

If the game continues with a pass of the ball (block 631), the next character on the passer's team sets the ball to a spiking character (block 633). The success of the set action, as with the receive action, can be timing based. Additionally, the player may be able to instruct the character to perform different set types, such as a slow, lobbing set or a quick, more direct set as is further explained in conjunction with FIG. 8A.

In this implementation, after a game character sets the ball (block 633), the ball's flight path may be displayed as a "spike meter," showing where the ball will travel between the setting character and the spiking character. A series of visual indicator prompts or "pips" may be displayed along the spike meter. As the ball travels along the spike meter, it will pass over each of the displayed "pips." Thus, the software detects when the ball encounters a pip (block 635). The pips could also be displayed along the flight path without actually displaying a spike meter.

When the ball encounters a pip, the player may press a controller button to attempt to "power-up" the ball. In order for the ball to "power-up," the player must successfully time the button press to correspond to the ball passing over the pip as explained above in conjunction with FIG. 7.

The software then determines whether or not the player successfully timed the button press to correspond with the ball passing over the pip (block 637). If the player timed the press correctly, the software changes a ball characteristic in some manner (block 639). The change may be a ball power-up, a ball physical state change or any other change suitable for the game being played. The software may also provide some audio, visual or tactile feedback indicating a success. If the player failed, the software may indicate that the player failed in the attempt, using similar feedback (block 643).

After a player succeeds or fails in a pip power-up instance, the software then determines if there are any pips remaining (block 641). If there are, the software returns to a state where it detects the ball encountering a pip. Otherwise, the software detects the point where the ball encounters the spike touch (block 645).

In this implementation, the spike touch is a multi-stage meter provided so that the player can indicate when the game character is to spike the ball. Different buttons, pressed in different stages, may create different spike results as is further explained above in conjunction with FIG. 7. Generally, however, like the pips, the spike touch requires a correctly timed button press to effectuate the spike.

The software then determines if the spike instruction was timed correctly (block 647). If the spike was poorly timed, the software may simply cause the game character to lob the ball back over the net, making the ball easy to receive (block 649). If the spike was properly timed, the software may add a degree of power to the spike based on the timing and other factors later described (block 651). The software may also affect the ball in other ways, based on the nature of the game being played. In this exemplary implementation, the player may also aim the spike, so the software also detects the spike target (block 653).

In addition to a spike target, the player may make an indication as to a particular spike speed or path, such as a looping path or a "change-up" spike, and the software accordingly adjusts the ball path (block 655). The game character then spikes the ball towards a targeted, receiving game character (block 657).

At this point the targeted character receives the ball (block 615).

Figure 11:
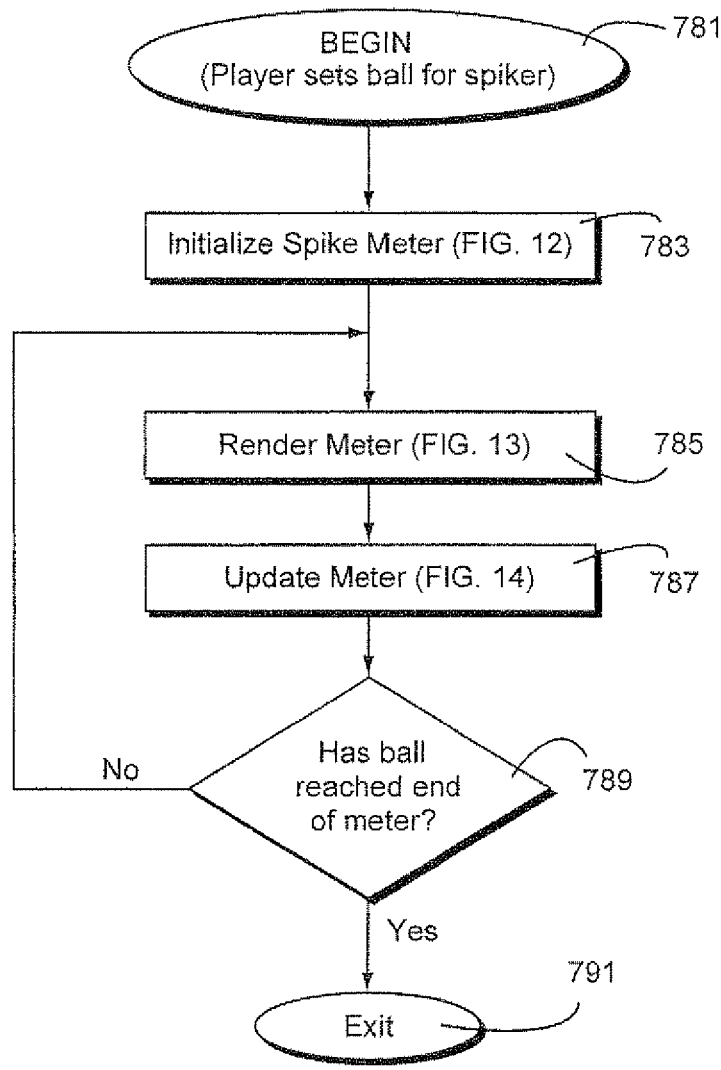
FIG. 11 shows an exemplary non-limiting software process for the provision and processing of a spike meter.

FIG. 11 shows an exemplary illustrative non-limiting software process for the provision and processing of a spike meter. At a step 781 another player has just set the ball for a player who is to be the spiking character. The process then initializes a spike meter (block 783). The process then renders the initialized spike meter (block 785), and the ball displayed in the game may begin traveling along the spike meter. As the ball travels, the meter needs to be updated (block 787). After an update, the process checks to see if the ball has reached the meter's end (block 789).

If the ball has reached the meter's end, the process exits (block 791). Otherwise, the process repeats a rendering step 785 and an update step 787. The repetition of these steps may continue until the ball has reached the meter's end.

Figure 12:
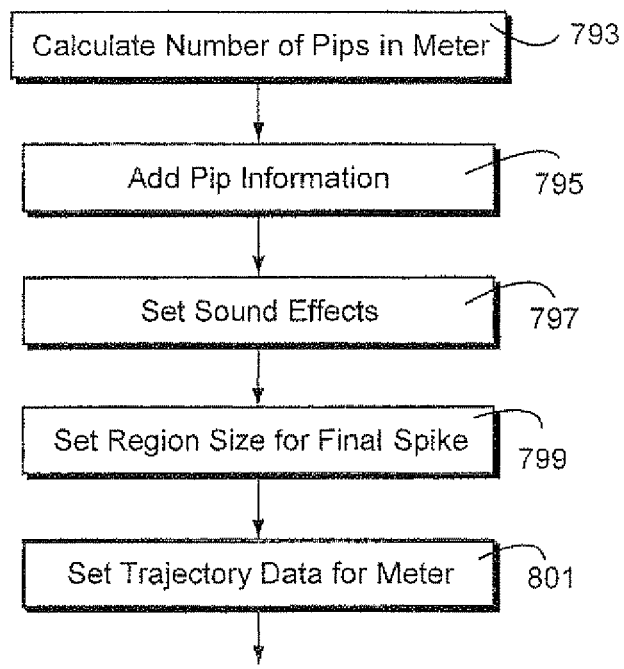
FIG. 12 shows an exemplary non-limiting spike meter initialization process.

FIG. 12 shows an exemplary illustrative non-limiting spike meter initialization process. According to this exemplary process, the number of pips to be displayed in the spike meter are calculated (block 793). Among other things, this calculated number might depend on the spiking player's location and whether a safe or risky move was used to set up the spike. The number of pips could vary on a variety of other factors as well.

After calculating the number of pips, the process adds pip information for each pip used in the meter (block 795). This information can include such things as pip spacing and a sound affect associated with each pip.

Then the process sets sound effects to be used depending on how well a pip timing was completed (block 797). A single sound effect could be used indicating success or failure, but in this exemplary implementation three possible outcomes are available, and three possible sound affects are set. A sound effect is set for an ok timing, a great timing and a perfect timing.

Next, the process sets the size of the region that accepts the final spike action input based on a variety of game factors (block 799). These factors can include such things as the spiking player's positioning and the spiking player's equipment. For example, a player in closer proximity to a net may have a larger spike zone, or possibly a smaller one. Also, if a player has certain power-up gear, this could also affect the spike touch size.

Finally, the trajectory data for the meter is set (801). This data may include such things as the starting world position (in x, y, and z coordinates in a 3D world), a ball velocity vector, the time until a spiking character impacts the ball, the gravity value that is applied to the ball, etc. This information allows the process to represent the trajectory of the ball as it travels from the setting character to the spiking character.

Additional steps can be added to this process as needed, this is just one exemplary process that may be used to initialize a spike meter.

Figure 13:
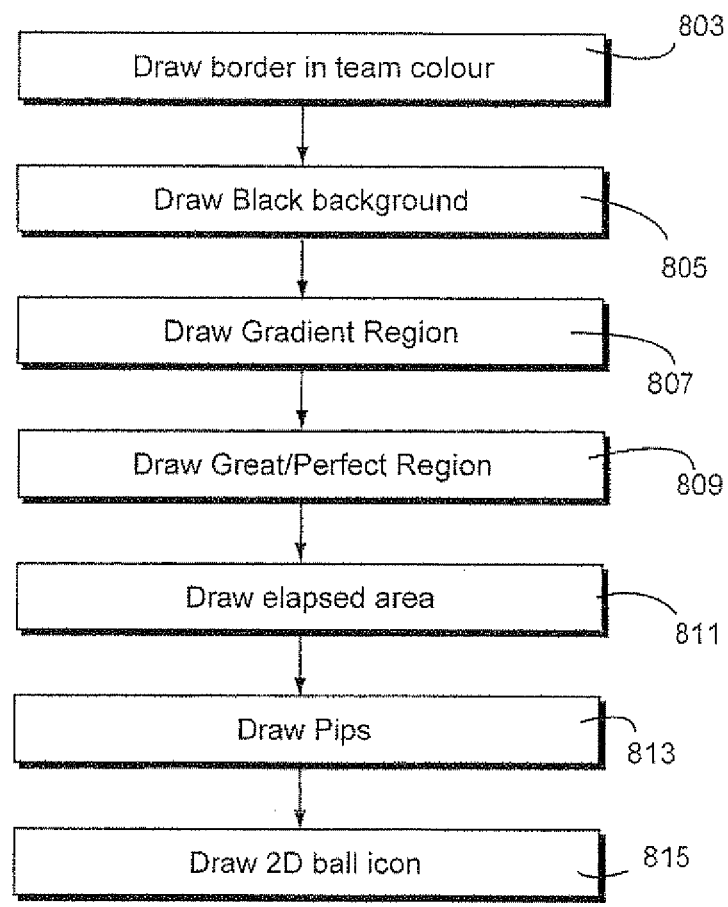
FIG. 13 shows an exemplary non-limiting process for rendering an initialized spike meter.

FIG. 13 shows an exemplary illustrative non-limiting process for rendering an initialized spike meter. A border is drawn around the spike meter in the color of the team about to make the spike (803). Then a black background is drawn within the rendered border (805). A gradient region is drawn on top of the black background (807). A great/perfect region is also drawn (809). A previously-elapsed area of the meter is also added (811). Pips are also drawn on the spike meter (813), and finally a ball icon is drawn (815). This can be a 2-D icon or the 3D ball. Any additional needed information can also be drawn on the meter at this point, and all of the above pieces of information are not necessary and can be changed depending on a game. The above are simply one set of appropriate renderings for the exemplary process presented in FIG. 11. A series of pips can also be displayed without rendering the entire path (i.e. background, border, etc.).

Figure 14:
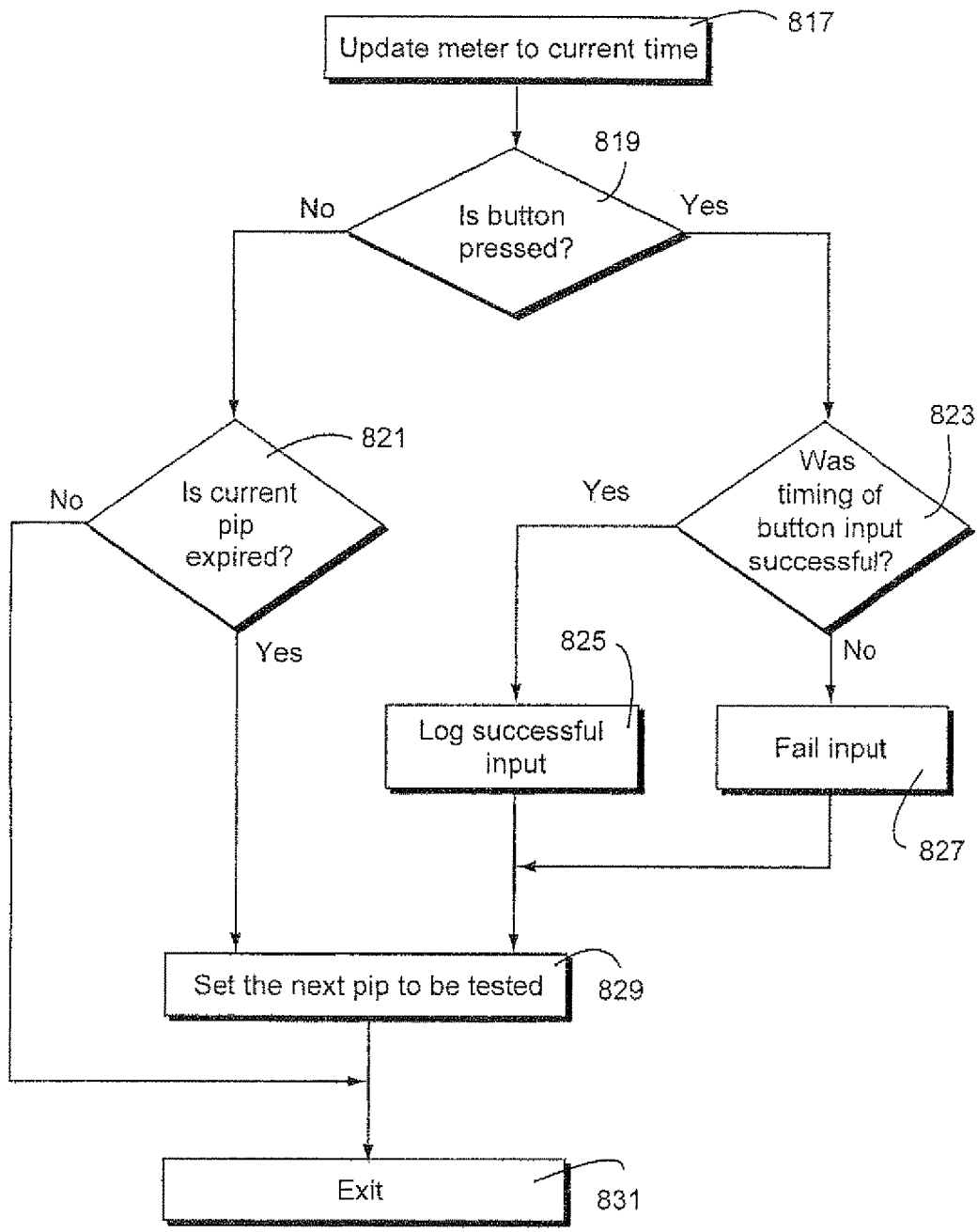
FIG. 14 shows an exemplary non-limiting process to update the spike meter.

FIG. 14 shows an exemplary illustrative non-limiting process to update the spike meter. According to this exemplary process, the meter is first updated to the current time (817). Then the process checks to see if an input button has been pressed (819). If the button has been pressed, the process then determines if the input timing was successful (823).

If an input button has not been pressed, the process checks to see if the current pip is expired (821). That is, the process checks to see if the ball has passed the point on the pip where an input button can still be pressed for that pip. If the pip has not expired, the process exits 831, but if the pip has expired, the process sets 829 the next pip to be tested before exiting 831.

If the process determines that the button press timing was successful (e.g. the button was pressed while the ball was over the appropriate pip portion), then the process logs a successful input (825) and sets the next pip to be tested (829) before exiting 831. If, on the other hand, the process determines that the timing was not successful, then the process determines that an input has failed (827) before setting the next pip (829) and exiting (831). Other processes could be used to update the meter, and steps of this process can be removed or other steps can be added, this is simply one exemplary spike meter update process.

Figure 15:
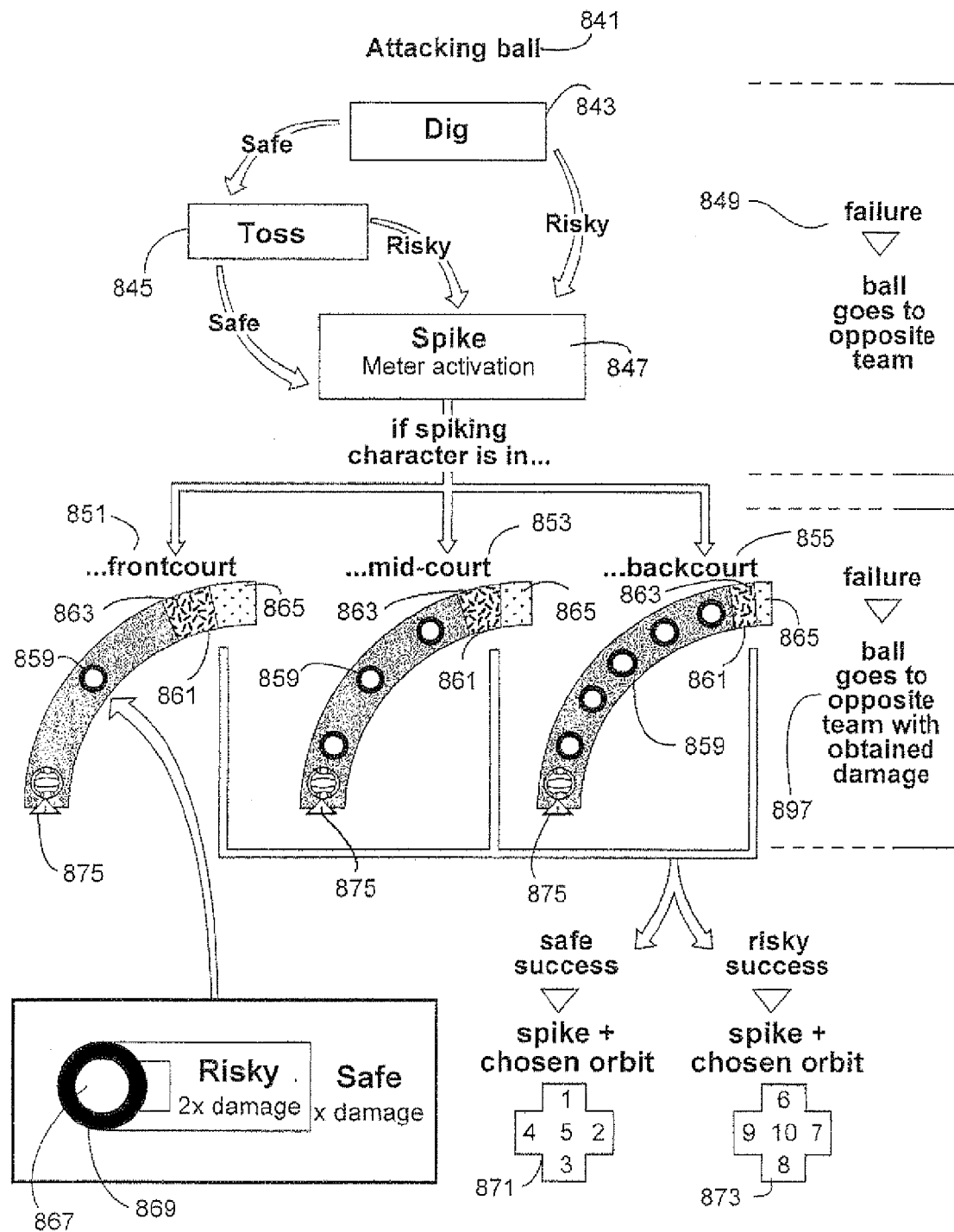
FIG. 15 shows an exemplary non-limiting process for a game action on one side of a net, including exemplary spike meters with exemplary sets of characteristics.

FIG. 15 shows an exemplary process for a game action on one side of the net, including exemplary spike meters with exemplary sets of characteristics. In this process, an attacking ball 841 is approaching from the other side of a net.

In order to properly return the attacking ball, the player on whose side the ball is about to land must first dig 843 the ball. In this illustrative exemplary non-limiting implementation, the player has the option to perform a dig 843 using a safe button or a risky button. If the safe button is successfully used, the process proceeds to a toss or "set" 845 action. If a risky button is successfully used, the process proceeds directly to a spike 847 action, bypassing the toss 845.

If at any point during the setup for the spike meter (i.e. before the actual set that causes the spike meter to be displayed) the player fails to correctly time a button press, the ball goes over to the other team in this implementation.

If the player elected and successfully completed a safe dig 843, then the process proceeds to a toss 845 action. This is the same as a set in actual volleyball. From the toss 845 action, the player again can chose a risky or safe toss in this exemplary implementation. Both lead to a spike 847 action upon successful triggering, but, depending on the game, a successful risky action might provide additional power-ups, make a return more difficult, etc.

Again, timing failure results in the ball being returned to the other team.

Once a game character has directed the ball towards a spiking game character, through a risky dig or a toss in this exemplary implementation, the software process performs a meter activation 847. Various spike meters may be displayed, shown here are three examples 851, 853, 855 of meters dependant on player positioning.

According to this exemplary implementation, if a spiking character is in the front court, a meter 851 is displayed having few pips 859 and a wide spike touch 861. Within the spike touch 861, the various areas for risky 865 and safe 863 spikes are large as well.

If the spiking character is at mid-court, however, the spike meter 853 has additional pips 859 and a smaller spike touch 861. Further, the safe area 863 of the spike touch and the risky area 865 of the spike touch have decreased in size.

In the third spike meter 855, provided in this exemplary implementation, when a spiking character is in the backcourt, the spike meter has even more pips 859 and an even smaller spike touch 861. On this spike touch, the safe area 863 has gotten smaller and the risky area 865 has all but disappeared.

There are many ways for a spike meter to be presented, these three examples are used for illustrative purposes only to show one exemplary manner in which game software may display a spike meter based on a player positioning.

According to this exemplary implementation, in any of the spike instances, if the player miscues on the spike (i.e. on the button press timing in the spike touch), the ball is sent over to the other team with the power it has thus far accrued.

If the player is successful in timing the spike, however, then according to this exemplary implementation the player can additionally select a preferred ball orbit or path based on a directional-pad input. Directional pads 871, 873 are shown for a safe and risky operation respectively. For example, if a player succeeded with a risky spike, that player might push 8 or down on the directional-pad 873 instructing a ball that drops very fast. Or, if a player succeeded with a safe spike, the player might push 1 or up on the d-pad 871 causing the ball to, for example, loop while in the air. A variety of orbital paths can be imagined, and such a path selection is not necessary if it is not appropriate for a particular game or situation.

In this exemplary implementation, the player has an additional chance to make a risky or safe operation when it comes to each button press timing over each pip. Pips, according to this exemplary implementation, have a larger safe zone 869 and a smaller risky zone 867. As the ball icon 875 passes over the pip 859, the player has a longer opportunity to press a safe button while the ball is in the safe zone 869 and a briefer opportunity to press the button while the ball is in a risky zone 867.

This can add another level of risk/reward to the game. For example, in one exemplary implementation, the determination of whether a button press was successful is based on where the center of the volleyball 875 is at the time of the button press. If the player presses the safe button, as long as the volleyball 875 center is anywhere within the larger, safe zone 869, the safe push will register. In this exemplary embodiment, the safe zone 869 corresponds to the area within the entire circle, not just the darkened area. This risky zone 867, is a smaller circle within the safe zone.

While a safe button press can be successfully registered while the ball is in the safe zone 869 or the risky zone 267 (since the risky zone overlaps the center of the large safe zone 269), the risky button press can be successfully registered while the ball is in the risky zone 867. This means that a player electing to perform a risky operation may need to more accurately time the press of a risky button. In this exemplary implementation, the player's accuracy is rewarded by a double damage multiplier, although any suitable affect could result from a risky button press success. More than two zones could also be provided within each pip to add additional levels of risk/reward.

Additional software flows can be used, depending on the game being played and a game situation. FIG. 15 simply shows an exemplary process and exemplary spike meters used in one particular game situation.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of playing a battle video game providing a video game play graphical user interface in accordance with instructions executed by at least one processor, the processor providing images for display and changing the images in response to user input, the method comprising:
    using the at least one processor, modeling at least one ball;
    using the at least one processor, and initiated based on input from a first user, generating an animation for display that shows the ball flying along a trajectory;
    using the at least one processor, displaying at least one action indicator along the trajectory of said ball the action indicator having features;
    using the at least one processor, accepting further input from the first user and determining timing of the further input relative to when the ball has correspondence with features of the action indicator; and
    using the at least one processor, based on the further input from the first user, applying a power boost to the ball while it is flying along the trajectory.

2. The method of claim 1 further including directing the flying ball toward a game character.

3. The method of claim 1 further including determining if the player input timing coincides with the ball passing over the features of the action indicator.

4. The method of claim 1 further comprising displaying the path the ball will take.

5. The method of claim 1 further comprising:
    using the at least one processor, selectively altering the ball and redirecting the ball towards a virtual target while the ball is in flight; and
    using the at least one processor, affecting the virtual target responsive at least in part to the selectively altered ball.

6. The method of claim 5 wherein the affecting the further virtual target includes changing a further virtual target associated property.

7. The method of claim 6 further comprising affecting a responsiveness property associated with the further virtual target.

8. The method of claim 6 wherein the changing a further virtual target associated property includes changing a health property associated with the further virtual target.

9. The method of claim 8 further comprising disabling the further virtual target if the changed health property crosses a predetermined threshold.

10. The method of claim 9 further comprising determining if a predefined target disabling goal has been met.

11. The method of claim 1 further including selectively changing the ball's virtual composition while the ball is flying along the trajectory.

12. The method of claim 1 wherein applying the power boost increases the ball's virtual damage causing capability when the ball strikes a target.

13. The method of claim 1 further comprising displaying the trajectory as a path.

14. The method of claim 1 further including
    providing the action indicator with a plurality of detection zones along the trajectory; and determining whether user input is provided while the ball is within a first of the plurality of detection zones, and
    determining whether user input is provided while the ball is within a second of the plurality of detection zones smaller than the first detection zone.

15. The method of claim 14 wherein the first detection zone encompasses the second detection zone.

16. The method of claim 14 wherein the plurality of detection zones comprises a plurality of concentric circles centered at an action indicator center.

17. The method of claim 1 wherein the processor applies higher power boost to the ball when the player controls the ball to fly over a shorter path to the target, the shorter path requiring a more precise correspondence between when the player provides input and correspondence between ball position and the action indicator.

18. A non-transitory storage device that stores a computer program, for use in simulating a competitive video game, having a processing system, the processing system executing the program to perform the steps of:
- initiated by user input, directing a displayed ball, having at least one associated characteristic, to fly along a trajectory towards a displayed virtual target;
- displaying, along the trajectory, at least one action indicator;
- determining timing of input of a first player;
- determining a timing relationship between the at least one determined player input timing and coincidence between the displayed virtual ball and the displayed at least one action indicator; and
- in response to further input by the first player, selectively applying a power boost to the virtual all at least in part responsive to the determined timing relationship while the virtual ball is in flight.

19. An apparatus operable to provide a competitive sports video game comprising:
- a projectile display routine for displaying a virtual ball object on a display and showing the virtual ball object flying through space along a flight path, including initiating flight of the virtual ball object through space along the flight path based on input by a player;
- a projectile control routine for controlling at least virtual ball object movement along the flight path towards a virtual target;
- an action indicator display routine for displaying at least one action indicator along the flight path of the virtual ball object;
- an input timing routine for determining timing of further input of the player
- a relationship determination routine for determining a relationship between when the virtual ball object coincides in position with at least one displayed action indicator and at least one determined player input timing; and
- a projectile alteration routine for selectively applying a power boost to the virtual ball object based at least in part on the determined relationship and said at least one determined player input timing.

* * * * *